May 31, 1960  H. G. DE FRANCE  2,938,945
COLOR TELEVISION SYSTEM
Filed July 23, 1954  8 Sheets-Sheet 1

INVENTOR
HENRI G. de FRANCE
BY
HIS AGENT

INVENTOR
HENRI G. de FRANCE
By [signature]
HIS AGENT

May 31, 1960  H. G. DE FRANCE  2,938,945
COLOR TELEVISION SYSTEM
Filed July 23, 1954  8 Sheets-Sheet 3
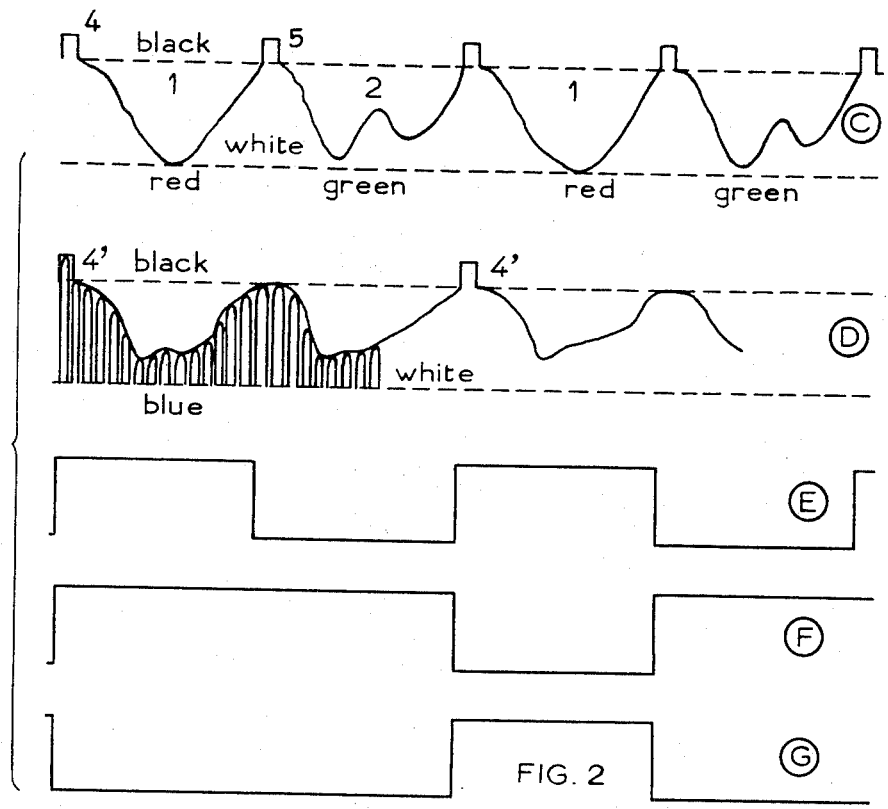
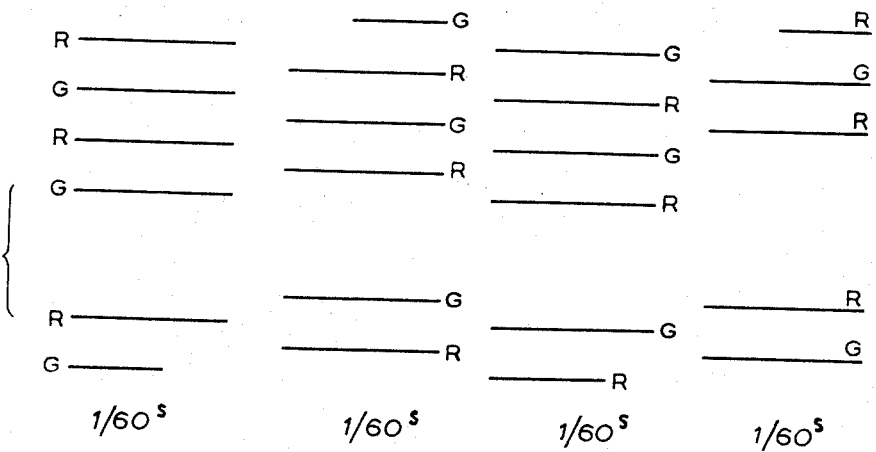
FIG. 5
INVENTOR
HENRI G. de FRANCE
By
HIS AGENT May 31, 1960 — H. G. DE FRANCE — 2,938,945
COLOR TELEVISION SYSTEM
Filed July 23, 1954 — 8 Sheets-Sheet 5

INVENTOR
HENRI G. de FRANCE
BY [signature]
HIS AGENT

May 31, 1960

H. G. DE FRANCE 2,938,945

COLOR TELEVISION SYSTEM

Filed July 23, 1954

INVENTOR
HENRI G. de FRANCE
BY
HIS AGENT

United States Patent Office 2,938,945
Patented May 31, 1960

2,938,945

COLOR TELEVISION SYSTEM

Henri Georges de France, 6 Ave. du Docteur Brouardel, Paris 17e, France

Filed July 23, 1954, Ser. No. 445,355

Claims priority, application France July 24, 1953

7 Claims. (Cl. 178—5.4)

The present invention relates to a compatible color television system. A color television system is said to be compatible when the following conditions are fulfilled: (1) a black-and-white television receiver of the commercial type will give from the video signal transmitted by the color system a black-and-white picture of a quality which compares with the picture obtained from a black-and-white signal; (2) the bandwidth which is occupied by the color signal is the same as the one available for black-and-white signal; (3) the range of a transmitter of given power is the same in black-and-white as in color.

Several color television systems have been disclosed up to now. Apart from the compatibility, they should fulfill colorimetric conditions which result from the study of color pictures. This study leads to results which may differ slightly but the most important of which may be summed up as follows: It is always possible to reproduce any natural color by addition of three monochrome pictures when the monochromes are chosen so that by adding two other monochromes, one does not get the third monochrome color and so that the addition of the three monochromes, in proper proportions, will give white. It is of general practice, in most of the color systems, to use three monochromes called respectively green, red and blue, and the exact hue of which corresponds to a color included under such names. The study of color vision shows also results concerning the relative maximum luminance of the different monochromes. If the luminance of a black-and-white picture obtained is 100 for white, the maximum luminance of the blue picture is 10 and the maximum luminance of the green and red pictures are approximately equal and between forty and sixty, the maximum luminance of the green picture being slightly larger than the red one. The resolving power of the eye varies also according to the color. In a green and a red picture the eye sees details, the dimensions of which are greater but of the same order of magnitude as the details which can be distinguished in a black-and-white picture. For blue pictures the eye cannot see fine details. These results help in designing the characteristics of color television signals. The power necessary to transmit the blue picture may be much lower than the power necessary to the transmission of red and green monochromes. On the other hand, it is useless to transmit a high definition blue picture since the eye is not sensitive to fine details in a blue picture. In the case of high definition television such as standardized in France (819 lines, 25 pictures per second), it is sufficient to transmit a blue picture in a bandwidth comprised between 1/10 and 1/20 of a black-and-white bandwidth. This ratio holds for any other standard of definition.

Other experiments have shown that flicker effect is as objectionable in color pictures as in black-and-white and the recurrence frequency of the pictures or fields should be of the same value approximately as for black-and-white television.

The color television systems which have been disclosed may be classified in two groups. In the first one, which corresponds to simultaneous systems, the information relating to each of the three monochrome pictures is transmitted at the same time, through the same or different video channels. Owing to the compatibility condition, this type of color television must use arrangements such that the three sets of information will not occupy a larger bandwidth than available for black-and-white television and give the same definition on the color picture as on the black-and-white picture. Such an arrangement has been provided for by the U.S. National Television System Committee. The other group of color television systems, which concerns the sequential systems, uses the sequential transmission of the information concerning each of the monochromes; the order of succession may be the picture order, the field order, the line or group of lines order or the point or group of points order. The signal used in this type of system does not require a larger bandwidth than black-and-white television, since at any moment only one information is transmitted. The frame or field sequential systems cannot be compatible. Indeed, the frame and field frequencies for each monochrome is 1/3 of the corresponding frequencies for black-and-white television. Therefore, to avoid flicker, it is necessary to increase such frequencies in the color system with respect to their values for black-and-white television. Furthermore, these systems require mechanical devices for rotating color filters in front of the picture display which are cumbersome and noisy.

The color system according to the invention will be called sequential-simultaneous. It is characterized by the fact that, at each moment, two informations belonging to two different monochrome pictures are transmitted simultaneously, with different definitions, the sequence of the transmission being equal to the line frequency or a sub-multiple thereof. More precisely, according to an embodiment of the invention, the green and red informations are transmitted with high definition in a line sequential way, the information concerning the blue picture being transmitted with low definition simultaneously with either of the two other informations and continuously. Due to the colorimetric studies which have been mentioned above, it may be shown that it is possible, in a high definition television system, to transmit the blue information in a bandwidth which is a very small fraction of the bandwidth available for black-and-white television. Therefore, it is possible without a noticeable loss in horizontal definition to transmit simultaneously the information concerning one of the two principal monochromes (green or red) and the blue information. According to a preferred embodiment of the invention, the blue information is transmitted at the upper end of the video bandwidth by heterodyning the blue low frequencies with a sub-carrier wave. The blue information is reproduced on black-and-white receivers as a very pale dotted pattern which is superimposed to the normal picture made of both the red and the green informations. The dotted pattern is very pale owing to the bandpass characteristics of most of the conventional receivers. Therefore, the quality of the black-and-white picture is very similar to the quality of the picture obtained from a monochrome transmission.

The vertical definition of the color pictures is numerically less than the vertical definition on the black-and-white picture. However, owing to the supplemental information due to color, the quality of the color picture is comparable with that of black-and-white pictures. As will be shown later, the vertical definition of the color picture is made higher than half the corresponding definition of the black-and-white picture.

It is an object of the invention to provide an all-electronic compatible color television system.

It is another object of the invention to provide a color television system in which the broadcast range or coverage of a color transmitter of a given power is approximately the same as the coverage of a black-and-white transmitter of the same power.

It is another object of the invention to provide a compatible color television system in which the same transmitter may be used to transmit color signals and black-and-white signals.

It is another object of the invention to provide a compatible color television system for which the receiver does not require any special device except the picture tube.

It is another object of the invention to provide a color television system which may operate any known type of color picture displaying means.

It is another object of the invention to provide a compatible television system which uses the same synchronizing signals as used for black-and-white television.

It is another object of the invention to provide a compatible television system in which the color synchronization is obtained by adding synchronizing signals of the same type as the synchronizing signal used for black-and-white television to one of the monochrome informations.

It is another object of the invention to provide a compatible television system in which two color informations are transmitted simultaneously, one of said informations being transmitted with a definition equivalent to the horizontal definition of a black-and-white picture.

It is another object of the invention to provide a compatible color television system in which one monochrome information is transmitted continuously, said information being associated with color synchronizing signals identical with or derived from black-and-white synchronizing pulses.

It is another object of the invention to provide a simultaneous-sequential compatible color television signal in which the rasters corresponding to the main monochromes are interlaced.

The invention will be better understood by reference to the following description and to the accompanying drawings in which Figures 1 and 2 are representative of the signal characteristics;

Figures 5 and 6 show two different scanning rasters for simultaneous-sequential television systems;

Figure 1:
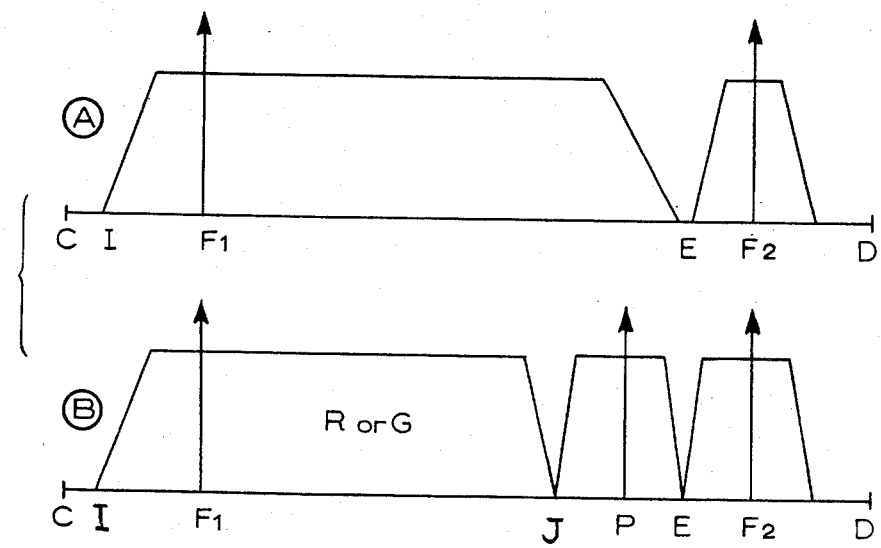

In Figure 1 curve A shows the partition of the inforbation inside the bandwidth C—D of a television channel for black-and-white television. $F_1$ and $F_2$ show respectively the sound and picture carriers. The sound is transmitted by any type of modulation of carrier $F_2$ in the frequency band E—D. The video signals are transmitted in the frequency band I—E. According to the invention the information corresponding to the main monochromes (red and green) are sequentially transmitted by modulation of carrier $F_1$, in the frequency interval I—J (curve B). The red information is transmitted during one line and the green during the following line. The information relating to the blue picture is transmitted continuously in a narrow frequency band J—E. This is obtained by filtering the blue picture signals through a low pass filter and heterodyning the output of said filter with a sub-carrier the frequency of which is near the upper end of the video band such as shown at P. The relative widths of the frequency intervals corresponding to each of the informations is not shown with the same scale. With a view toward obtaining a clearer picture, in the case of the N.T.S.C. television signals the frequency interval between the two carriers $F_1$ and $F_2$ is equal to 4.5 mcs. The frequency difference between sub-carrier P and carrier $F_1$ is of the order of magnitude of 4 mcs. As is well known, to reduce any interference which may be produced between the side bands of sub-carrier P and the video signals of the main monochrome, the frequency of sub-carrier P is chosen equal to an odd multiple of half the line scanning frequency.

Curves C and D of Figure 2 show the video signal transmitted respectively in the frequency interval I—J and J—E during two lines. As shown, frequency interval I—J is alternately occupied by the red signal 1 and the green signal 2. 4 and 5 are the line synchronizing signals which are identical with synchronizing pulses used for black-and-white television. Curve D shows the signals which are transmitted in the frequency band J—E. The envelope of the signal is always the blue picture. As shown, synchronizing pulses 4' are associated with this signal. The frequency of pulses 4' is half the line frequency. They are produced when the main monochrome which is transmitted is, for instance the red one, and they are used to identify the red information from the green information at the receiving end. Curve E of Figure 2 shows the square wave controlling the color selection at the receiver and delivered by the color selecting generator synchronized by pulses 4'. The use of signal E depends on the type of receiver which is used as will be explained later. It is one advantage of the simultaneous-sequential color television system that the color identification is performed by means of pulses which are already available at the transmitter for another purpose. Of course, other means may be used to identify the color of the information which is actually transmitted such as have been disclosed in prior art line sequential color television systems. Color identification may also be obtained by means of a high frequency burst such as used in the N.T.S.C. color television system. Curves F and G of Figure 2 will be explained later.

Figure 3:
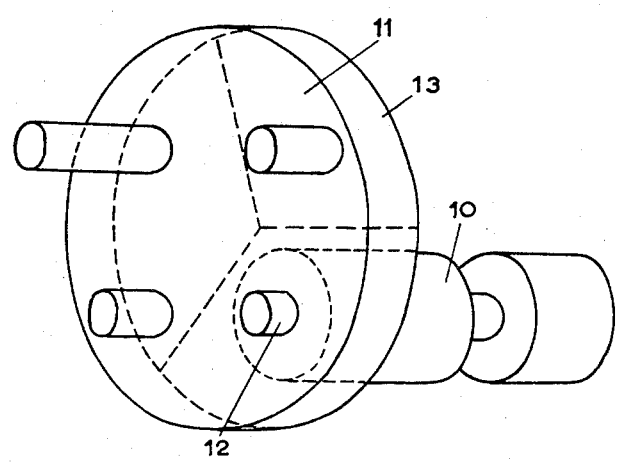
Figure 3 shows schematically a camera unit.
Figure 4:
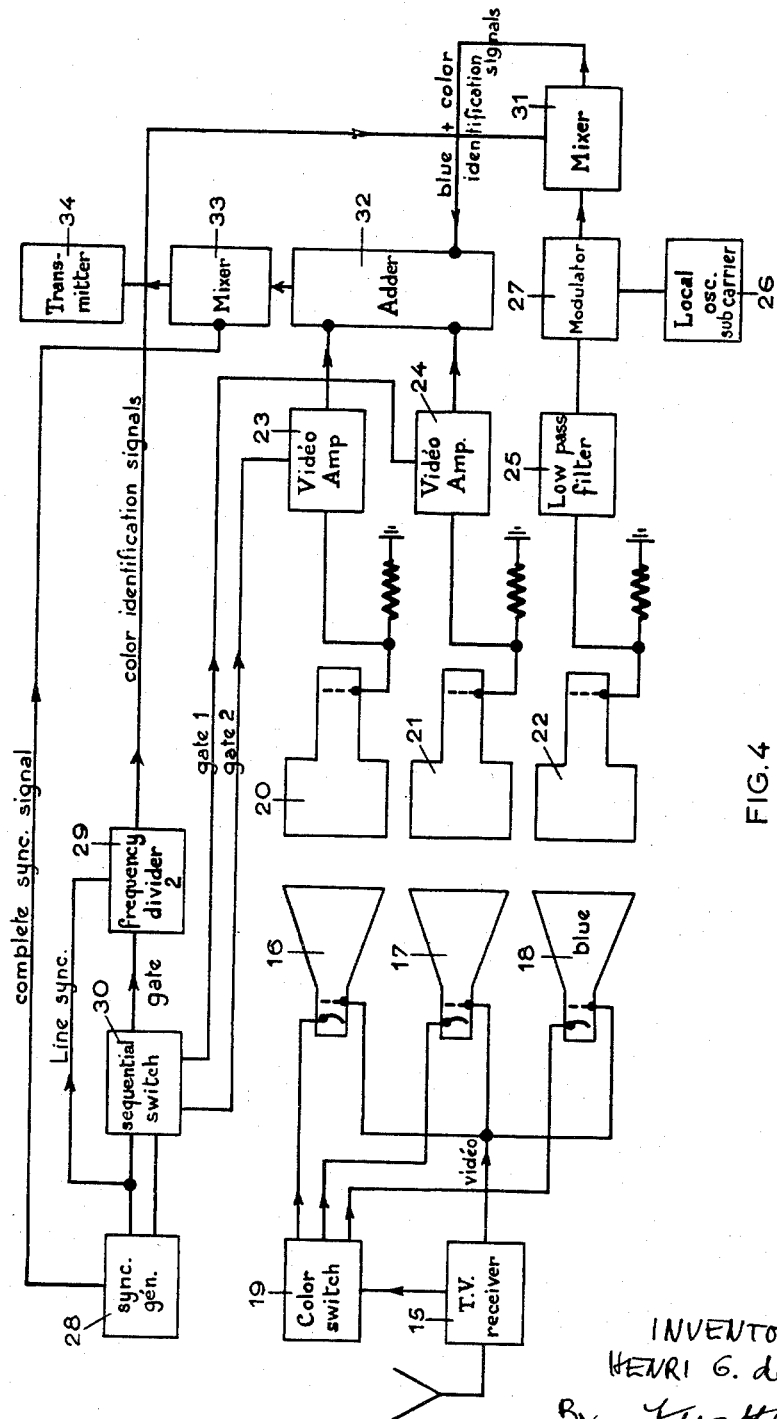
Figure 4 shows an encoding unit fed by the camera of Figure 3 and delivering signals such as shown on Figures 1 and 2.

Figure 3 shows a preferred form of camera unit which may be used to supply with color signals an encoding unit, shown in Figure 4, which delivers signals for the transmission according to the simultaneous-sequential system. Figure 3 shows schematically a camera unit operating according to a field sequential system. It comprises a pick-up tube 10 which is associated with a lens turret 11. The operating lens is shown at 12. Between the lenses and the pick-up tube is placed a disk filter 13 which includes three or five filters selected in accordance with the three monochrome colors chosen for the transmission.

Owing to the definition characteristics of the different monochrome signals, it is possible at the camera to distinguish between the three monochromes by increasing the quantity of information seen through the red and green filters with respect to the blue one by using a disk 13 incorporating five filters: two green filters, two red filters and one blue. The colorimetric characteristics of such filters have been set by the International Illumination Committee. The rotation of disk 13 is such that one filter stays in front of the pick-up tube during one field. To suppress flicker on the monochrome pictures, the field frequency is increased with respect to black-and-white television as is well known per se. The scanning raster includes the same number of lines as black-and-white pictures, i.e. for example, two successive fields of 312.5 lines each, interlaced with one another so that the raster comprises 625 lines scanned in $1/3 \times 1/60$ sec. or $1/5 \times 1/60$ sec. The frequency bandwidth necessary to transmit the video signal delivered by such camera is therefore wider than the bandwidth available for black-and-white television. But this is not objectionable since the wide frequency band is only necessary on the link between the camera and the encoding unit of Figure 4.

The wide band signal is transmitted either directly or by means of a radio link to the encoding unit of Figure 4.

The output signal from the camera unit is received at the encoding unit of Figure 4 by a wide band receiver 15 which feeds in parallel three storage units shown as cathode ray tubes 16, 17 and 18. A color identifying signal which is synchronized on the rotation of disk 13 controls color switch 19 which selects at every moment, the incoming video signal so that each storage unit receives only the video signal corresponding to one monochrome and does not receive the video signals relating to the other two monochromes. Synchronized switches of various types which may serve as color switch 19 are well known in the art, of course. It is obvious that switch 19 may be simply a properly synchronized motor driving a three-way mechanical switch. Synchronized switching of three color signals in shown and described in Patents Nos. 2,319,789; 2,323,905; 2,329,194; and 2,437,690. In these patents relating to color disk synchronization for a field sequential system such as the Columbia Broadcasting System color television system, the color sequence in the field sequential pick-up is constant and one of the colors is associated with a color identifying pulse. This pulse, which is correctly phased with respect to the sequential signal field synchronization, is used to trigger an electronic switch comprising one input and three out-puts, the in-put being connected to the video out-put of the television receiver and each of the out-puts being connected to one of the cathode ray tubes. Storage unit 16, 17 and 18 will therefore only receive video information in one field out of three or one field out of five for the blue responsive tube and two fields out of five for the red and green channels. Their storage capacity is chosen such that they display the corresponding monochrome pictures during all the time with approximately constant luminance. As is understood, the line synchronizing on storage units 16, 17, 18 is synchronous with the line scanning at the camera, that is three or five times the normal line frequency. Each of the storage units 16, 17, 18 cooperates with a reading unit shown as pickup tubes 20, 21 and 22. The scanning frequencies on these reading units are chosen equal to that of black-and-white signal, i.e. 15.750 cycles for the line frequency and 30 cycles for the frame frequency. In order to prevent any luminance variation due to the fact that the writing speed on storage units 16, 17 and 18 is three times the reading speed, at units 20, 21, 22 it is necessary to use storage units which show a persistance of the order of magnitude of the duration of one scanning field at the reading speed. The synchronizing signals for storage units 16, 17 and 18 are supplied by the wide band receiver 15 since they are identical with the scanning speeds used at the camera. Synchronizing signals for the scanning of reading units 20, 21, 22 are supplied by synchronizing generator 28 which delivers synchronizing signals identical with black-and-white synchronizing and blanking signals. Generator 28 feeds directly in parallel the three scanning assemblies (not shown) of the pick-up tubes 20, 21, 22. Synchronizing generator 28 feeds also sequential switch 30 as will be explained later. Line synchronizing signals from generator 28 are also applied to frequency divider 29 which performs a frequency division by 2 under the control of sequential switch 30. Frequency divider 29 is a gated pulse amplifier using the output from sequential switch 30 as gating signals. The output signals from reading units 20 and 21 are respectively amplified by video amplifiers 23 and 24. Said video amplifiers are controlled by sequential switch 30 so as to be conductive during one line scanning and non-conductive during the next one, amplifier 23 being conductive when amplifier 24 is non-conductive and so on. The output signal from reading unit 22 is transmitted through a low pass filter 25 before being heterodyned in circuit 27 with sub-carrier at frequency P delivered by local oscillator 26. The line synchronizing pulses delivered by frequency divider 29 constitute the color identification signals, which signals are then mixed with the output from circuit 27 in mixing stage 31. Video amplifiers 23 and 24 and mixing unit 31 feed the adder unit 32. Synchronizing pulses delivered by generator 28 are added to the output signals from adder 32 in mixing unit 33. The output from circuit 33 is ready to modulate transmitter 34.

It is generally useless to use color cathode ray tubes or any color responsive element in the different channels of the encoding unit. Therefore, it is possible to use standard parts readily found as commercial parts and the design of the encoder is therefore very simple. As is well known the encoding operation may be used to introduce some video signal corrections in the transmission channels, such as gamma correction, shading correction and so on. The ratio of the gains of the different channels of the encoding unit are different so as to adjust the selective characteristics of the color filters used on the camera in accordance with the luminance efficiency of the color fluorescent powders used on the color television receivers, to obtain the proper working conditions. On the other hand, some effects in the video signals due to the camera unit may be compensated by a proper design of the encoding unit, for instance by using a negative picture displayed on the storage cathode ray tube. By picking up a negative picture of the scenery by means of reading units 20, 21, 22, it is possible to obtain an automatic gamma correction, a shading correction and an improvement in the signal-to-noise ratio. Of course, the signal transmitted by transmitter 34 corresponds to a positive picture.

Figure 6:
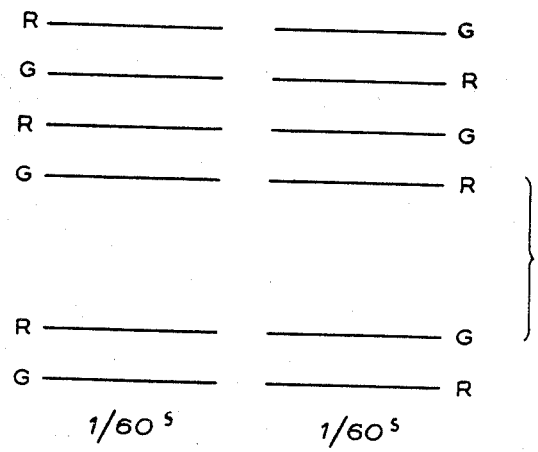

Figure 5 shows the line raster on pick-up units 20, 21, 22, assuming that the color signal is obtained from an interlaced scanning such as used in black-and-white television. The lines belonging respectively to the green and red monochromes appear as lines labeled R and G on the raster and these lines are the sum of the out-put signals from video amplifiers 23 and 24, since each of them is conductive only during one line out of two. The figure shows four successive fields such as delivered by the encoding unit of Figure 4 when, irrespective of the field scanning sequential camera, sequential switch 30 delivers a control signal such as curve E of Figure 2. Under these circumstances, it can easily be seen that four fields are necessary so that one given line of the raster be scanned twice in the same color, i.e. the whole color cycle lasts for $4 \times 1/60 = 1/15$ sec. This characteristic is not detrimental as far as the color picture is concerned since in the meantime the same geometrical line of the complete picture is covered by a line corresponding to the other main monochrome, whatever the type of receiver considered. However, when the black-and-white picture appearing on a black-and-white receiver is considered, this may become detrimental when the mean luminance of one of the main monochromes is very different from the mean luminance of the other monochrome. In these circumstances, a bright line is followed by a dull line and a bright line is covered by another bright line at a frequency of 15 per second. A flicker effect may appear on the black-and-white picture especially in bright areas. This flicker effect may easily be avoided according to a secondary feature of the invention by using a reading raster which comprises an even number of synchronizing lines and by modifying the sequence between the two main monochromes so that, at field frequency, a line corresponding to one of said monochromes may be covered by a line corresponding to the other one. Thereby a complete color cycle is performed at frame frequency (30 cs.) which avoids any flicker effect on the black-and-white picture. The quality of the color picture is increased with respect to any other kind of scanning arrangement, especially, as was stated above, when the mean luminances of the two main monochromes are very different. It is necessary to slightly modify the line scanning frequency with respect to the line scanning frequency of black-and-white television. Figure 6 shows the scanning raster using a 524 lines raster instead of a 525 lines one. However, the system remains compatible since this frequency variation is much lower than the frequency variation of the line scanning generator which may occur owing to the variation in the mains supply frequency. In fact, it corresponds to a variation of less than 0.2% from the standard black-and-white scanning frequency (15.750 cs.) Under these circumstances the black-and-white picture given by a standard television receiver is made of two fields comprising an integral number of lines. Therefore, the interlacing disappears. This corresponds to a small loss in vertical definition on the black-and-white picture with respect to the normal black-and-white picture. The loss in vertical definition being in a ratio of 1 to 1.4 when the picture is composed of two fields comprising an even number of lines, the lines of which are in geometrical register. The interlacing is maintained on the color picture by the sequential transmission of the two main monochromes instead of by the geometrical displacement of the lines of two successive fields. As it appears from Figure 6, the color sequence is reversed at the end of each field.

Figure 7:
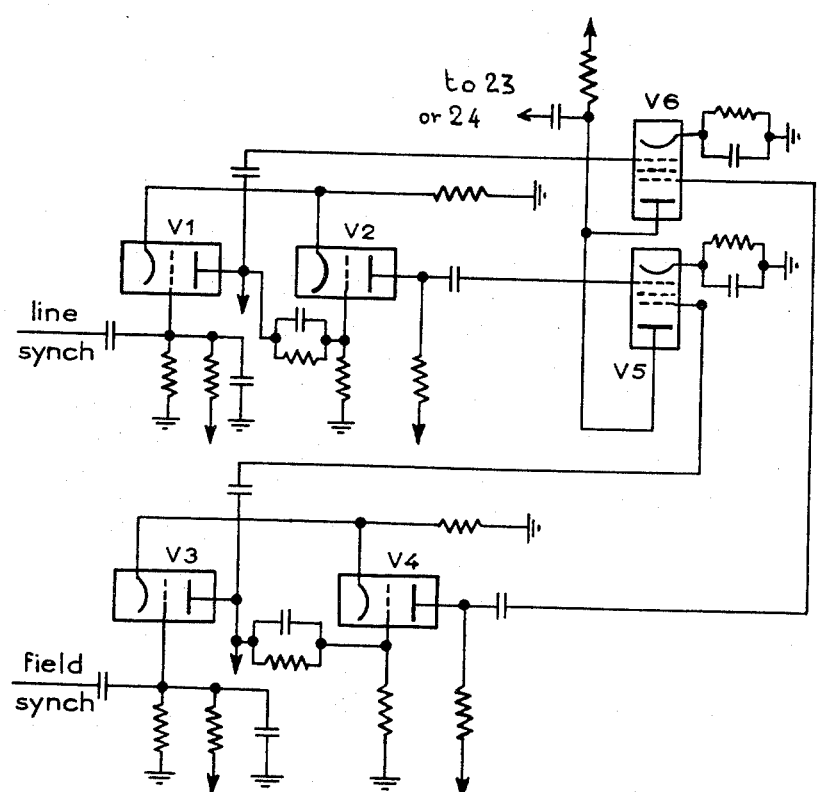
Figure 7 shows a color-switching generator.

Figure 7 shows in detail an embodiment of the sequential switch 30 which controls commutation between the red and green channels so as to obtain an out-put signal from pick-up units 20 and 21 identical with that of Figure 6. The switch is made essentially of a conventional bistable circuit comprising two valves $V_1$ and $V_2$ fed with line synchronizing pulses or line blanking pulses, associated with a second conventional bistable circuit comprising valves $V_3$ and $V_4$ fed with controlling pulses derived from field synchronizing, equalizing or blanking pulses. The field and line synchronizing pulses are supplied to the grids of tubes $V_1$ and $V_3$ by synchronizing generator 28. Both circuits are designed as Schmitt triggers or multivibrators, the connections of which are obvious. The output signals from the $V_1$—$V_2$ trigger circuit are two square waves of inverse polarity the fundamental frequency of which is equal to half the recurrent frequency of the line pulses. One of these signals is shown on curve E of Figure 2. The output signals from trigger circuit $V_3$—$V_4$ are of the same shape but occur at half the field frequency (15 cs.) instead of half the line frequency (7.890 cs.). The output signals from trigger circuit $V_1$—$V_2$ are applied to two separate resistance coupled amplifier stages $V_5$ and $V_6$ of the multigrid type. The output signals from trigger circuit $V_3$—$V_4$ control each of the amplifiers. The constant bias on amplifiers $V_5$ and $V_6$ is such that when the negative part of the square wave delivered from trigger circuit $V_3$—$V_4$ is applied to their second control grid they are cut off; they are however conducting during the positive half wave. Therefore one of the amplifiers $V_5$ and $V_6$ is conductive during one field while the other is non-conductive, and conversely during the next field of scansion. The switching of the amplifying stage is automatically performed during field flyback time. Therefore, the output from the sequential switch is a square wave at half the line frequency (curve E of Figure 2) the phase of which changes at field frequency. The output of amplifiers $V_5$ and $V_6$ is applied through capacitor 36 in the manner shown in Figure 11 to the video amplifier 23 directly and through a polarity inverter 45 to amplifier 24 of the red and green channels so as to operate them alternately. The out-put from capacitor 36 also is fed to frequency divider 29 as a gating signal.

The synchronizing pulse generator 28 may be of the type described in application Serial No. 456,258, corresponding to French Patent No. 1,092,372, and in "Television Broadcasting," first edition, by H. A. Chinn, page 144. This synchronizing comprises essentially a preset binary counter which feeds gating generators. The gating signals control coincidence stages fed directly from a master oscillator. When such a type of generator is used for black and white transmission, it may readily deliver the signals for a color transmission by a change in the presetting of the binary counter. As explained in the above publications, it is possible to control the presetting of this counter by means of low impedance circuits and a set of relays so as to provide automatic switching of the synchronizing signal, whether the transmitter works in black-and-white or in color. For black-and-white transmission, the video signals are directly fed to mixing unit 33, of the encoding unit.

When the number of lines of the complete picture is not a multiple of four, that is when the number of lines per field is an odd number, the sequential switch of Figure 7 may be simplified by suppressing the switching signals at field frequency (stages $V_3$ and $V_4$) together with the two controlled amplifying stages $V_5$ and $V_6$ since one of the square wave signals delivered by trigger $V_1$—$V_2$ is sufficient to control the selection of the monochrome video channels so as to provide a raster in which a color cycle lasts 1/30 of a second. The natural sequence red—green—red—green is sufficient to achieve this condition. Sequential switch 30 comprises only $V_1$ and $V_2$. The out-put from, say $V_1$, is fed as a gating signal to both video amplifier 23 and frequency divider 29.

Figure 8:
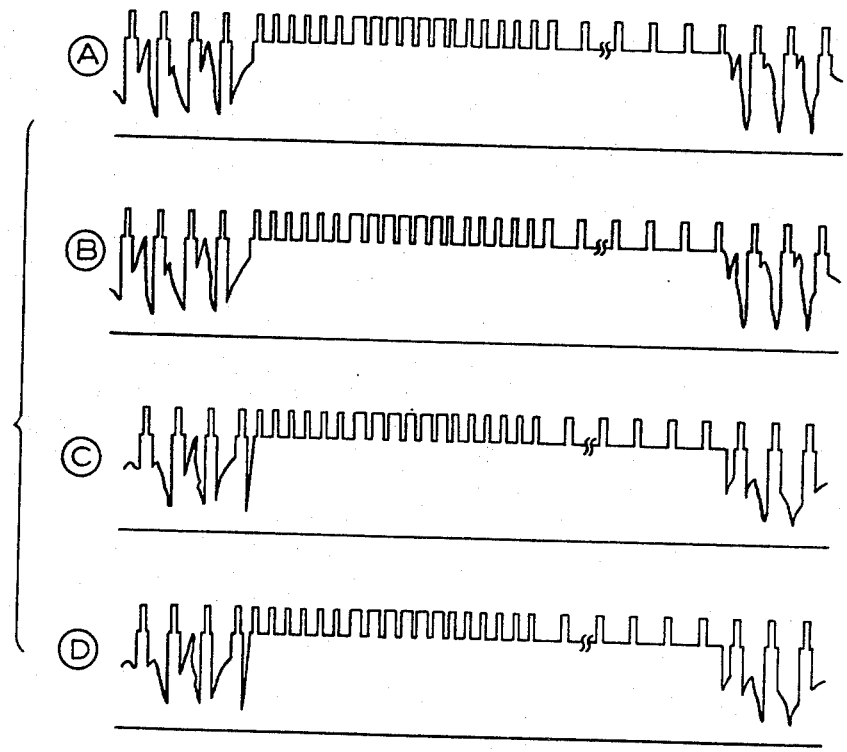
Figure 8 shows the field synchronizing signals used according to one embodiment of the invention.

Curves A and B of Figure 8 show the field synchronizing signals of two successive fields. As stated above, the lines in two successive fields are in geometrical register owing to the fact that each field comprises an integral number of lines. Therefore, the edges of the equalizing and field synchronizing pulses are similarly phased with respect to the line synchronizing pulses for all the fields. As is well known, in the standard black-and-white interlaced scanning, there is half line outphasing between two successive fields synchronizing pulses, with respect to the line synchronizing pulses. The black-and-white picture which is displayed on a black-and-white receiver from the color signals is no longer obtained by means of an interlaced raster and the vertical definition is lower than in an ordinary black-and-white picture.

According to another feature of the invention, means are provided whereby the color picture is color interlaced as has just been explained and the black-and-white picture given on an ordinary receiver is, at the same time, geometrically interlaced according to standard television practice. To achieve this result according to the invention, means are provided whereby the field synchronizing signals for four successive fields are such as shown on curves A, B, C and D of Figure 8. After the fourth field the signals reproduce themselves in the order A, B, C, D. As shown in Figure 8, the phase of the field synchronizing signal with respect to the line synchronizing pulses is maintained constant for two successive fields, then an out-phasing of half a line duration is introduced for another succession of two fields, after which another out-phasing of a half line duration is again introduced, in opposite direction, so as to cancel the one previously introduced and so on.

Figure 9:
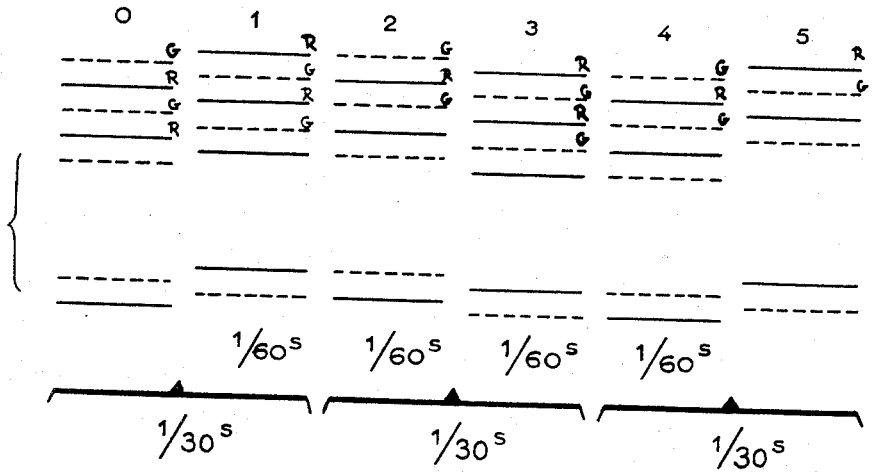
Figure 9 shows four scanning rasters obtained by using the field synchronizing signals of Figure 8.

Figure 9 shows the rasters described by the scanning beam during four successive fields. As shown, the rasters described during fields 1 and 2 are identical with the rasters shown in Figure 6. That is to say each 1/60 of a second each green line is covered by a red line and so on. These two fields correspond e.g. to fields synchronizing signals shown on curves A and B of Figure 8. Fields 3 and 4 are geometrically displaced, with respect to the rasters described during fields 1 and 2, in the vertical direction by an amount equal to half the distance between two adjacent lines. As shown in Figure 9, the black-and-white picture will be constituted by two geometrically interlaced fields scanned on the cathode ray tube as is usual in standard black-and-white television in 1/30 of a second and, on the color picture, a green line is replaced by a red line in 1/60 of a second also. The field synchronizing signals such as shown on curves A, B, C, D of Figure 8 are easily delivered by means of a synchronizing generator such as described in the above-mentioned French application. The last field of the preceding raster is labeled 0, and is the same as field 4, while the first field of the next raster is labeled 5 and is the same as field 1.

Figure 10:
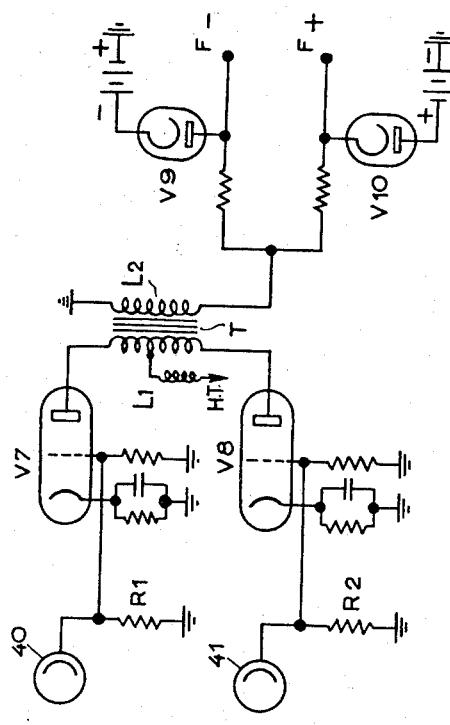
Figures 10, 11 and 12 show circuit diagrams of a line sequential switch for varying the ratio between the number of red lines and the number of green lines.
Figure 11:
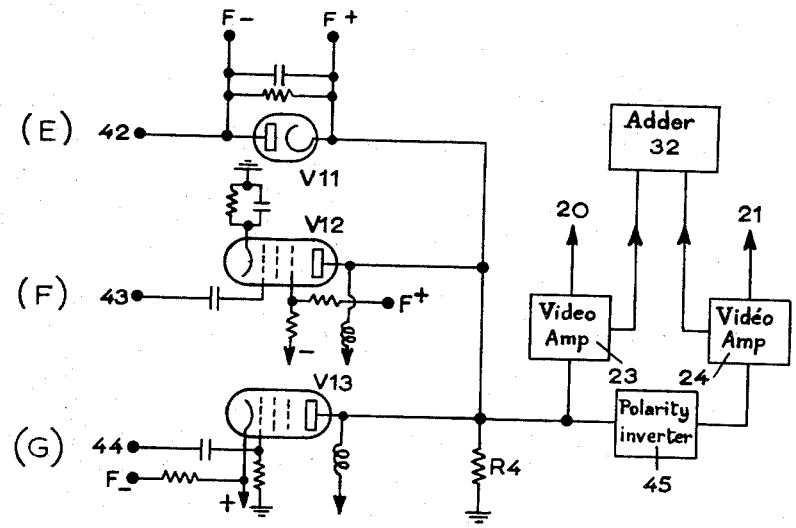
Figure 12:
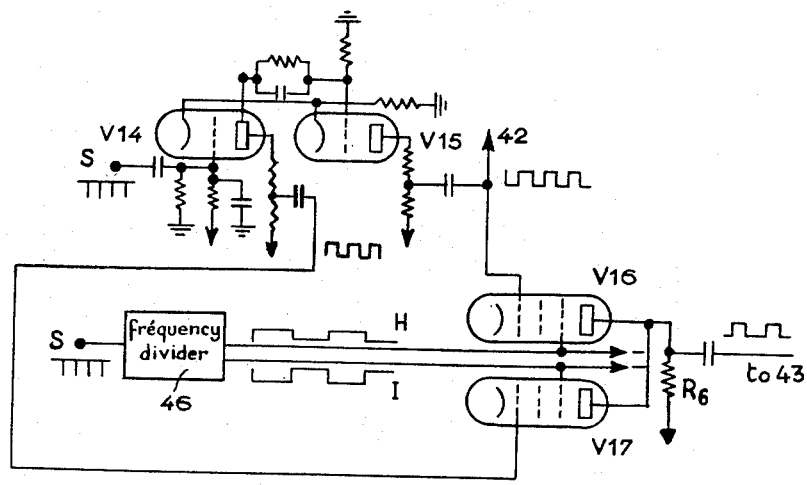

The scanning rasters which have been described up to now comprise the same number of green lines and of red lines. According to another embodiment of the invention, means are provided whereby the ratio between the green and red lines may be varied according to the mean luminance of each of these two monochrome pictures. Owing to the fact that in a color picture there remain always some red parts in a green picture or some green parts in a red picture, means are provided whereby said ratio may be varied between ½ and 2. Said means comprise a sequential switch such as 30 of Figure 4 which is controlled according to the mean luminance of the green monochrome picture and the red monochrome picture. Figures 10, 11 and 12 show schematically the different circuits which constitute said sequential switch. Two photoelectric cells 40 and 41 receive the light corresponding to the picture displayed on storage units 16 and 17 of the encoding unit shown on Figure 4, associated respectively to the red and the green video channel. The voltages across load resistances $R_1$ and $R_2$ shunted by condensers $C_1$ and $C_2$ are proportional to the variations of the mean luminance of the monochrome pictures, the time constants $R_1$, $C_1$ and $R_2$, $C_2$ being longer than the frame duration. These signals are fed separately to two amplifying stages $V_7$ and $V_8$. Said amplifiers feed a common load differentially. Said load is the primary $L_1$ of a transformer T the secondary of which is shown as $L_2$. The voltage across $L_2$ reproduces the difference between the photoelectric currents from cells 40 and 41 and is therefore a function of the difference in the luminances of the two monochrome pictures. The voltage at the lower end of $L_2$, which may be either positive or negative with respect to earth potential, is applied to a limiting circuit having two diodes $V_9$ and $V_{10}$ connected in opposition. Cathode of $V_9$ and anode of $V_{10}$ are maintained respectively at negative and positive bias voltages which are set to the limiting voltage. According to the voltage polarity at the lower end of $L_2$ and its value, a signal appears at one of the terminals F— or F+. No signal appears if the voltage is less than the limiting level corresponding to the bias voltages on diode $V_9$ and $V_{10}$. Such bias voltages are chosen so that no signal appears if the difference in luminance of the two monochrome pictures is below 40%. If the luminance of the red monochrome is more than 40% higher than the luminance of the green monochrome a negative signal is applied at voltage terminal F—. If the difference is the other way round, a positive voltage appears at terminal F+. Control signals developed at terminals F— and F+ are applied to a three-directional switch such as shown on Figure 11. This switch has three inputs shown as 42, 43, 44 to which are applied signals shown respectively on curves E, F and G of Figure 2. Signal E is a square wave signal of periodicity equal to twice the line scanning period and which comprises positive and negative parts the duration of which corresponds to one line of scansion. Curves F and G are rectangular waves with a periodicity equal to three times the line scanning period. Signal F has a positive part which lasts for two lines and a negative part, the duration of which corresponds to one line. Signal G has a positive part, the duration of which is equal to one line. As shown, the three-directional switch comprises three stages shown respectively as V11, V12 and V13, connected to the same load $R_4$. Signal E is applied to the anode of diode V11, the anode of which is also connected to F— terminal; the cathode of V11 is connected to the F+ terminal. Therefore, signal E is only transmitted if no signal appears either at the F+ terminal or the F— terminal, which means when the luminance of the red and green monochromes differ less than 40%. The output signal appearing across $R_4$ is sent directly to control video amplifier 23 of the green channel and by means of out-phasing or inverter unit 45 which produces a 180° phase shift, to control video amplifier 24 of the red channel. Both F and G signals are applied separately to multigrid amplifiers V12 and V13 which are normally cut off by means of suitable bias voltages. V12 is cut off by means of a negative voltage applied to its suppressor grid and V13 is normally cut off due to a positive bias on its cathode. F+ terminal is connected to the suppressor grid of V12 and F— terminal to the cathode of V13. If a positive voltage appears at the F+ terminal, diode V11 is cut off, and so is amplifier V13. Amplifier V12 is conductive and signal F controls the video amplifier 23 which means that the output color signal comprises two lines of the green monochrome and one line of the red monochrome. If a negative voltage appears at terminal F— the negative voltage is applied to the cathode of amplifier V13 which becomes conductive and signal G of Figure 2 controls video amplifier 23. Under these circumstances the output signal comprises the green signal for one line and the red signal for two lines.

Figure 12 shows the generator of signal F and E. The generator for signal G may easily be designed by reference to this circuit, being simply the inverse of signal F, or by inverting signal F. The generator includes a conventional Schmitt trigger or multivibrator made of tubes V14 and V15, controlled by negatively polarized line synchronizing pulses applied at terminal S. The output signal of stage V15 corresponds to signal E. It is a square wave the fundamental frequency of which is half the line frequency which shows a positive part of duration equal to one line and a negative part of the same duration. An identical but 180° out of phase signal is obtained at the output of stage V14. Line synchronizing pulses are also applied at a terminal S' to a frequency divider 46 which divides by 3. Frequency divider 46 includes a multivibrator fed with the output signals from a dividing stage. The output signals from frequency divider 46 are two square waves 180° out of phase from each other, at ⅓ the line frequency with positive and negative parts of the same duration and equal to three line scansions such as shown at H and I in Figure 12. The output signals from unit 46 control the suppressor grid of two multigrid amplifiers V16 and V17 the control grids of which are connected respectively to the outputs of V15 and V14. Amplifiers V16 and V17 feed a common load R6. Bias voltages on the suppressor grid of amplifiers V16 and V17 are such that they are not conducting during the negative parts of square waves H and I. The output voltage at terminal 43 is therefore, during three lines, signal E and during the three succeeding lines signal E', 180° out of phase with signal E. As will readily be seen, such a signal is of the form shown by curves F and G, depending on the relative phases of the signals impressed on V16 and V17.

For some special broadcast, it may be preferred to transmit twice as many signals relating to the green monochrome as to the red one. Therefore, the sequential switch of the type shown on Figure 12 will be used to control video amplifiers 23 and 24 without any controlling effect by means of the luminance of the monochromes. Therefore, controlling photoelectric cells 40 and 41 together with the three-directional switch of Figure 11 may be omitted, sequential switch 30 of Figure 4 being the switching generator shown in Figure 12.

Figure 1, it has been explained, shows a special distribution of the video signals inside the television channel. The main monochromes are transmitted in frequency band I—J and the low frequency monochrome is transmitted simultaneously with one of the two main monochromes in the frequency band J—E which is the higher part of the transmission channel. When the color signal is displayed on a black-and-white receiver, the two main color signals are used to constitute the black-and-white picture. Therefore, two successive lines on the black-and-white picture may belong to two different monochrome pictures. The low frequency part of said monochrome pictures may be widely different which may cause an unsteadiness of the picture especially when the mean luminances of both monochromes are very different from each other. According to another embodiment of the invention, the frequency distribution of the information is such that the low frequency part of the channel is occupied by the blue information which is transmitted in a continuous way; the green and red high frequencies are transmitted in the ordinary way by modulation of the high frequency carrier and the low frequencies of the red and green monochromes are transmitted at the upper end of the television channel, after frequency transposition by modulation of a sub-carrier.

Figure 13:
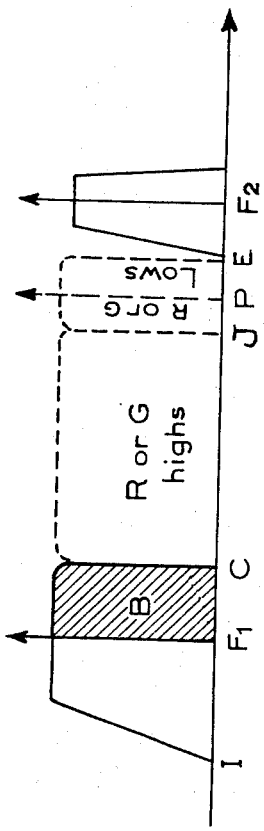
Figure 13 shows another distribution of the color signals in the frequency channel.

Figure 13 shows the corresponding frequency distribution of the video information inside the transmission channel. As shown on Figure 13, the blue information B occupies the frequency interval $F_1C$ shown in hatched lines, the red or green low video frequencies are transmitted by modulation of sub-carrier P at the upper end J—E of the video channel. $F_1$ and $F_2$ show respectively the video and sound carriers.

Figure 14:
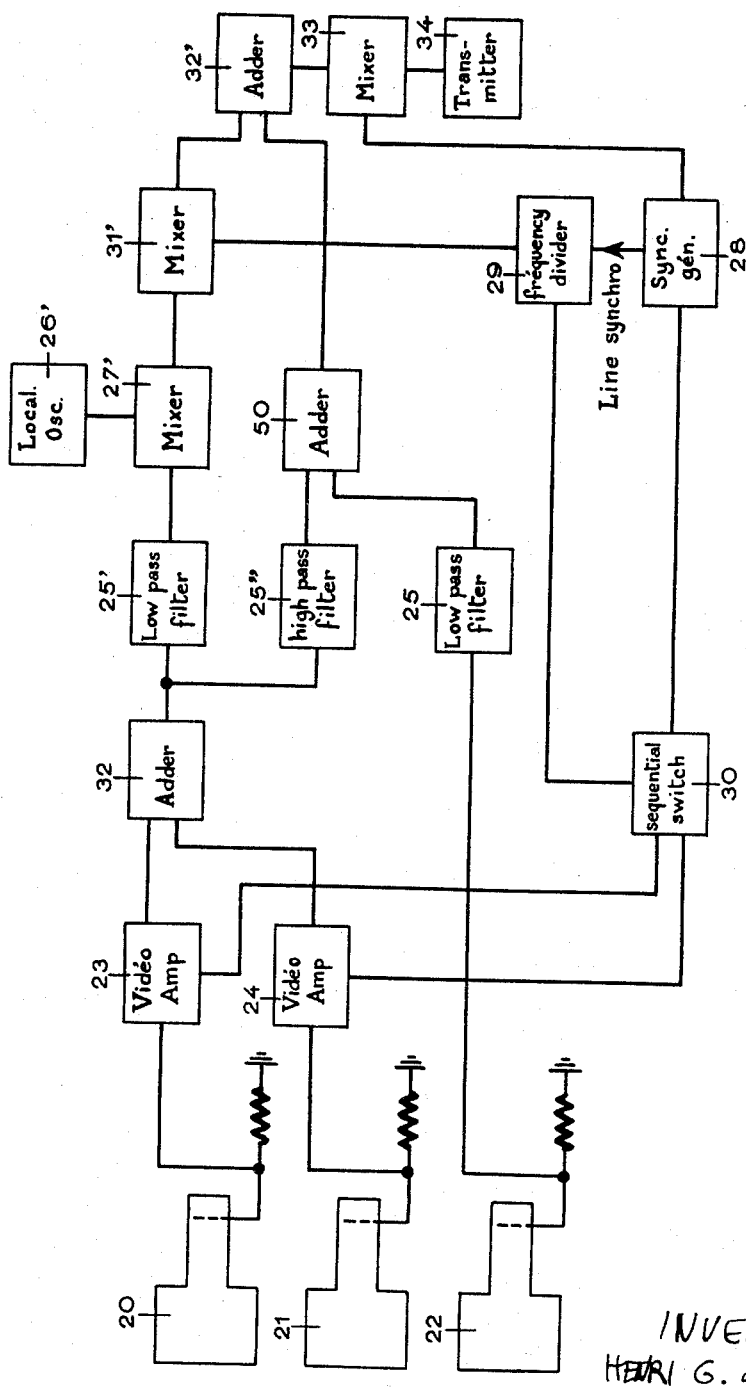
Figure 14 is a block diagram of an encoding unit delivering signals such as shown in Figure 13.

Figure 14 is a block diagram of the encoding unit shown in Figure 4 when the transmission is made according to the spectral distribution shown in Figure 13. As in Figure 4, the reading units are shown at 20, 21 and 22. They correspond respectively to the green, red and blue channel. The green and red signals are applied respectively to video amplifiers 23 and 24 controlled by the sequential switch 30. The output from reading unit 22 is transmitted by means of low pass filter 25 to adder unit 50. The outputs from video amplifiers 23 and 24 are added in adder 32. The red or green signal is fed to a filtering arrangement comprising low pass filter 25′ the characteristic of which is the same as low pass filter 25 and the high pass filter 25″ the cut-off frequency of which is the same as the cut-off frequency of filter 25′. The outputs from filters 25 and 25″ which correspond, respectively, to the blue informations and to the high video frequencies of the red and green monochromes are fed to adding unit 50. The output from unit 50 corresponds to the video information transmitted in the frequency band $F_1E$. The output from low pass filter 25′ is heterodyned in stage 27′ with the sub-carrier wave supplied by the local oscillator 26′. Color identifying signals are added to the low red or green video signals in mixer 31′ as delivered from frequency dividing stage 29 controlled by the sequential switch 30 as was explained in accordance with Figure 4. The outputs from mixer 31′ and adder 50 are applied to adder 32′. The blanking and synchronizing signals are added in adder 33 which feeds directly the transmitter 34.

Figure 15:
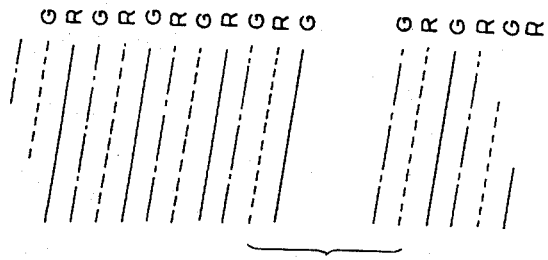
Figure 15 shows a raster having three interlaced fields of color signals.

The different scanning rasters which have been shown such as in Figures 6 and 9 are related either to non-interlaced rasters or to rasters comprising two interlaced fields. When an interlaced scanning is used, half of the lines of the raster belong to the red monochrome and the other half to the green one, unless a special arrangement such as disclosed in Figures 10, 11 and 12 is used. When the mean luminance of one of the two main monochromes is very large with respect to the other one, a stroboscopic effect may occur which is detrimental to the vertical definition of the picture displayed on a black and white receiver. According to another feature of the invention, means are provided whereby such effect is at least partially cancelled by the use of a three interlaced field scanning. Thereby the number of lines per black and white picture is maintained sufficiently high even when one of the two monochromes is almost absent from the televised scene. According to the invention, the number of full pictures per second is decreased from 30 to 20 per second, which is still high enough to prevent any unsteadiness in the picture (flicker), each of the complete pictures comprising three interlaced fields each of which is made of, say 262⅓ lines. The complete picture comprises 787 lines which are each scanned 20 times per second. The raster corresponding to the complete picture is shown on Figure 15. The full lines correspond to the first field, the interrupted lines to the second field and the dot-and-dashed lines to the third field. To obtain a color interlacing on the complete picture there may be used a sequential switch 30 such as shown in Figure 7 where the control voltage varies at half the line frequency and at the field frequency. Such a scanning is compatible with black-and-white television since the line frequency is changed from 15,750 cs. (525 times 30) to 15,740 (787 times 20). The field scanning frequency is maintained at the same value. The black-and-white picture will be made up of three fields instead of two and the vertical definition is increased over an ordinary picture. If one of the main monochromes is very much less brilliant than the other one, half of the 787 lines of the picture will appear pale with respect to the other half. The loss in vertical definition due to the lack of video informations in one of the monochromes is less detrimental since the picture comprises still the information brought by 363.5 lines instead of 262.5 lines in the case of a two fields interlaced raster.

It will be apparent to those skilled in the art that the principles of the invention may be realized by arrangements and apparatus differing from those disclosed herein for the purpose of illustrating the manner in which the invention may be carried out. The description herein given has, therefore, been particularly directed to the principles of the invention and the principles of several embodiments thereof instead of conventional specific circuit details, from which many variations and departures are possible. Since many variations of the invention will be apparent, it is intended to include the aspects of the invention within the scope of the following claims.

What I claim is:

1. A color television system which is compatible with a given black-and-white television system, comprising first means for producing and storing a green, a red and a blue monochrome image of a scene, second means for scanning each of said images line by line and producing three separate monochrome electrical signals, a transmitter, third means for feeding two of the monochrome signals line by line and sequentially to the transmitter, fourth means for causing the blue signals to occupy a different frequency band from that of the other two signals, the fourth means including low-pass filtering means for reducing the bandwidth of the blue signals to a smaller bandwidth than that occupied by either the red or green signals and means connected to the filtering means for heterodyning the blue signals to transpose them to a frequency band outside that occupied by the red and green signals, and means for feeding the blue signals to the transmitter simultaneously with both the green and red signals, the blue signals occupying a small portion of the frequency channel and the green and red signals each occupying a major portion of the frequency channel.

2. A system according to claim 1, wherein said third means produces an integral number of lines per field and phases the lines so that each red or green monochrome line of one field geometrically coincides in the next field with a line of the other color.

3. A system according to claim 1, wherein said third means comprises video amplifiers for the red and green signals, respectively, sequential switching means for generating two series of pulses having a 180° phase relationship and a frequency equal to one-half the line frequency, means for reversing the phases of each series of pulses at the end of each field, and means gating one of said video amplifiers with each series of pulses.

4. A system according to claim 1, including means for generating line and field synchronizing pulses and means for shifting the timing of the line synchronizing pulses relative to the field synchronizing pulses back and forth by half the period of one line and causing said shifting to occur after each pair of fields.

5. A system according to claim 1, including means for generating line synchronizing pulses and field synchronizing pulses having a relative timing such that three successive fields are interlaced each relative to the other two.

6. A system according to claim 1, wherein said third means comprises means for commutating the red and green signals so that one line of signals of one of said colors is followed by a plurality of lines of signals of the other color.

7. A system according to claim 6, including means for determining the average luminance of the red and green images of the televised scene, and means responsive to said average luminances for causing the number of red and green lines to be equal when one luminance does not exceed the other by a predetermined amount, and for causing twice as many lines of signals of one color as of the other color to be transmitted when the average luminance of said one color does exceed that of the other color by more than said predetermined amount.

References Cited in the file of this patent

UNITED STATES PATENTS

| | | |
|---|---|---|
| 2,333,969 | Alexanderson | Nov. 9, 1943 |
| 2,558,489 | Kalfaian | June 26, 1951 |
| 2,580,685 | Mathes | Jan. 1, 1952 |
| 2,587,006 | Smith | Feb. 26, 1952 |
| 2,666,806 | Kalfaian | Jan. 19, 1954 |
| 2,678,348 | Ballard | May 11, 1954 |
| 2,683,768 | Bliss | July 13, 1954 |
| 2,825,753 | Hausz | Mar. 4, 1958 |

FOREIGN PATENTS

| | | |
|---|---|---|
| 709,245 | Great Britain | May 19, 1954 |